(12) United States Patent
Qureshi

(10) Patent No.: US 10,541,535 B2
(45) Date of Patent: Jan. 21, 2020

(54) APPARATUS AND METHOD FOR AGGREGATING AND SUPPLYING ENERGY TO A LOAD

(71) Applicant: KILOWATT LABS, INC., New York, NY (US)

(72) Inventor: Waseem Ashraf Qureshi, Dubai (AE)

(73) Assignee: Kilowatt Labs, Inc., New York, NY (US)

( * ) Notice: Subject to any disclaimer, the term of this patent is extended or adjusted under 35 U.S.C. 154(b) by 0 days.

(21) Appl. No.: 15/954,993

(22) Filed: Apr. 17, 2018

(65) Prior Publication Data

US 2018/0301906 A1    Oct. 18, 2018

Related U.S. Application Data

(60) Provisional application No. 62/486,654, filed on Apr. 18, 2017.

(51) Int. Cl.
*H02J 3/38* (2006.01)
*H02J 7/00* (2006.01)
(Continued)

(52) U.S. Cl.
CPC ............... *H02J 3/38* (2013.01); *G05B 15/02* (2013.01); *H02J 3/18* (2013.01); *H02J 3/1821* (2013.01);
(Continued)

(58) Field of Classification Search
CPC .... H02J 9/062; H02J 9/061; H02J 9/06; H02J 3/383; H02J 3/32; H02J 3/38; H02J 3/385;
(Continued)

(56) References Cited

U.S. PATENT DOCUMENTS 8,693,228 B2    4/2014  Matan et al.
9,178,354 B2   11/2015  Oleynik et al.
(Continued)

OTHER PUBLICATIONS

Transmittal of the International Search Report and The Written Opinion of the International Searching Authority.
(Continued)

*Primary Examiner* — Richard Isla
*Assistant Examiner* — Manuel Hernandez
(74) *Attorney, Agent, or Firm* — Duane Morris LLP

(57) ABSTRACT

An apparatus and method for aggregating and supplying energy includes a plurality of power modules for inverting a first type of electrical power, which is supplied to the power modules from multiple sources of power, to a second type of electrical power at an output of the power modules for delivery of the inverted power to a storage device for future use, or to an electrical load, or to a regional or central utility grid. A microcontroller (the "power microcontroller") is carried by and incorporated within each of the power modules and each is configured for controlling the power inversion operations. A microcontroller (the "control microcontroller") carried by the control module is configured for monitoring voltage levels within the at least one energy storage device and for rebalancing voltage within the energy storage device and for correcting lead and lag power factor. Means for selectively supplying power received from said multiple disparate sources of power to the destination are provided.

28 Claims, 10 Drawing Sheets

(51) Int. Cl.

| | | |
|---|---|---|
| *G05B 15/02* | (2006.01) | |
| *H02J 3/18* | (2006.01) | |
| *H02J 3/32* | (2006.01) | |
| *H02J 3/46* | (2006.01) | |
| *H02J 7/34* | (2006.01) | |
| *H02J 13/00* | (2006.01) | |
| *H02J 9/06* | (2006.01) | |
| *H02J 1/10* | (2006.01) | |

(52) U.S. Cl.
CPC ............... *H02J 3/32* (2013.01); *H02J 3/383* (2013.01); *H02J 3/386* (2013.01); *H02J 3/46* (2013.01); *H02J 7/0021* (2013.01); *H02J 7/0072* (2013.01); *H02J 7/34* (2013.01); *H02J 1/10* (2013.01); *H02J 1/102* (2013.01); *H02J 3/1807* (2013.01); *H02J 3/1864* (2013.01); *H02J 3/385* (2013.01); *H02J 7/0068* (2013.01); *H02J 9/06* (2013.01); *H02J 9/061* (2013.01); *H02J 9/062* (2013.01); *H02J 13/0006* (2013.01); *H02J 2009/068* (2013.01)

(58) Field of Classification Search
CPC .... H02J 3/386; H02J 3/381; H02J 3/46; H02J 3/18; H02J 3/1807; H02J 3/1821; H02J 3/1864; H02J 3/1842; H02J 1/10; H02J 1/102; H02J 7/34; H02J 7/0068; H02J 7/0021; H02J 7/0072; H02J 7/35; H02J 2009/068; H02J 13/0006; G05B 15/02
USPC ...... 307/43–46, 48, 64–66, 82, 85; 320/138, 320/139
See application file for complete search history.

(56) References Cited

U.S. PATENT DOCUMENTS

| | | |
|---|---|---|
| 9,300,132 B2 | 3/2016 | Pan et al. |
| 2006/0043793 A1* | 3/2006 | Hjort ...................... H02J 9/062 307/1 |
| 2009/0160259 A1* | 6/2009 | Naiknaware ........ H02M 7/4807 307/82 |
| 2010/0208501 A1* | 8/2010 | Matan ...................... H02J 3/18 363/95 |
| 2011/0006600 A1* | 1/2011 | Fontana .................... H02J 1/10 307/25 |
| 2011/0095606 A1* | 4/2011 | Ou .......................... H02J 3/383 307/26 |
| 2013/0234521 A1* | 9/2013 | Eom ........................ H02J 3/18 307/66 |
| 2014/0306543 A1* | 10/2014 | Garrity ................... H02M 7/44 307/82 |
| 2016/0043555 A1 | 2/2016 | Howell |
| 2016/0079807 A1 | 3/2016 | Nguyen |
| 2016/0118792 A1* | 4/2016 | Rosendahl ................ H02J 3/16 700/295 |
| 2016/0164291 A1* | 6/2016 | Rosendahl ................ H02J 3/14 700/295 |
| 2017/0187190 A1* | 6/2017 | Asano ..................... H02J 3/383 |
| 2017/0321497 A1* | 11/2017 | Morris .................... F16L 3/237 |
| 2018/0076625 A1* | 3/2018 | Gudgel ................... H02J 3/382 |
| 2018/0233911 A1* | 8/2018 | Rosendahl ................ H02J 3/14 |
| 2019/0140453 A1* | 5/2019 | Yi ........................... H02J 3/385 |

OTHER PUBLICATIONS

Omega Energy Innovations; "QMICC™—Monitor Inverter Converter Charger"; pp. 1-8.

Omega Energy Innovations; www.qmega.ae; "QMICC™ Based Solar Power, Energy Independence with Storage".

Omega Energy Innovations; www.qmega.ae; "QMICC™ Based PV Solar System".

* cited by examiner

APPARATUS AND METHOD FOR AGGREGATING AND SUPPLYING ENERGY TO A LOAD

CROSS REFERENCE TO RELATED APPLICATIONS

This is a Non-Provisional Patent Application which claims priority to U.S. Provisional Application No. 62/486,654 filed Apr. 18, 2017 entitled "METHOD AND APPARATUS OF AGGREGATING AND SUPPLYING ENERGY" the entirety of which is incorporated herein by reference.

FIELD OF THE INVENTION

The invention relates generally to the field of aggregating, generating and supplying electric energy. More specifically, the invention is directed to an apparatus and method of aggregating such energy from multiple and diverse generation sources, regulating and controlling the generated energy, and optimally supplying the generated energy to a load, independently, or supplying the generated energy to a utility grid or supplying the energy generated to both the load and the utility grid. The apparatus of the invention is sometime referred to herein as the "energy server" or simply the "server".

BACKGROUND

In recent years, the adverse effects of climate change and global warming have led to an increased interest in renewable energy as a clean and abundant energy source. A global effort is underway to transition away from fossil fuel based electrical energy generation to renewable generation. However, this transition has significant technical, political and geopolitical challenges that need to be overcome.

Renewable energy is abundantly available everywhere in the world. However, renewable energy is intermittent, non-dispatchable (which means that it cannot be turned on and off as required) and depending on geography and the type of renewable energy, is available for only limited amounts of time during a day.

The energy requirements of communities and of the world generally, however, are for a continuous supply of stable electricity, 24-hours a day.

Many existing electricity networks are currently designed to deliver a continuous supply of stable electricity, 24-hours a day. However, their design is usually based on predictable sources of energy and, dispatchable generation that is available 24-hours a day.

Because grid networks are designed for predictable, disptachable generation that is available 24-hours a day, it has limitations that include the need for large sums of capital to grow the network and long lead times to build infrastructure, the interdependence of which causes vast areas of the network to concurrently fail and causes major maintenance and upkeep requirements.

Due to these limitations, especially the need for large capital expenditures required, there are still about 1.3 billion people in the world who do not have any, or proper, access to electricity.

Therefore, in order to overcome the limitations of the existing grid infrastructure and uniqueness of renewable generation, distributed energy solutions have to be developed that enable electricity to be generated and consumed in the same location. These solutions must consist of renewable generation technologies, such as photovoltaics solar ("PV"), wind, energy storage (batteries), and a control system that enables the generation, regulation, control and delivery of continuous, stable electricity 24-hours a day.

The solution to this problem is believed to lie in providing different generation sources to be aggregated and the generated energy regulated and controlled. Then, the aggregated energy can be supplied to energy storage systems for availability during non-generation times. The load will thus be managed.

Currently, attempts are being made to build such solutions by combining multiple sources of renewable energy, including other generating systems such as the utility grid, various types of energy storage, into a single system with an AC and/or a DC output. This typically requires connecting each individual energy generation source to a central controller, designing complex software that monitors the load profile and dispatches energy from the appropriate source and managing the multiple communications protocols between the various energy sources, the controller and the load. Such integration typically requires complex software customized for each deployment. While such deployments are being rolled out, they are inadequate to meet the needs of a proper transition from fossil fuels to a renewable based energy network.

SUMMARY OF THE INVENTION

To replace fossil fuels, control electronics must deliver all the functionality that the grid network now delivers, as well as delivering stable, continuous and resilient power. Therefore, it is important to note that all the features necessary to operate a network are designed and available in the sever of the present invention, thus making them work optimally with each other. By eliminating multiple hardware systems and software components which are typically supplied from different manufacturers, the energy server also eliminates risks of incompatibility, thus delivering a more stable and resilient solution than a solution that is composed of different products.

Consistent with the foregoing and in accordance with the invention as embodied and broadly described herein, an apparatus and method of aggregating energy from multiple and diverse generation sources, regulating and controlling the generated energy, and optimally supplying the generated energy to a load, independently, or supplying the energy generated to the utility grid or supplying the energy generated to both the load and the utility grid is described in suitable detail to enable one of ordinary skill in the art to make and use the invention.

Specifically, the invention is directed to an apparatus and a method for aggregating and supplying energy. The apparatus includes a plurality of power modules for inverting a first type of electrical power (such as DC power), which is supplied to said power modules from multiple disparate sources of power, to a second type of electrical power (such as AC power) at an output of each of the power modules for storage for future use, or for driving an electrical load or for transmitting to a central or regional grid. A first busbar (such as a DC busbar) is connected with the multiple disparate sources of power and is also connected with the plurality of power modules for providing the first type of electrical power thereto. A second busbar (such as an AC busbar) is connected with an output of each of the plurality of power modules for receiving said second type of electrical power from said power modules and for making said second type of electrical power available for use at a destination. A power microcontroller is carried by and incorporated within each of said power modules, and each power microcontroller is configured for controlling power inversion operations of said power modules. The discharge microcontroller is further configured for generating controlled pulses of charge and discharge for increasing storage capacity of the at least one energy storage device. A control module is connected with said plurality of power modules, and an interface may be connected with the control module for effecting communication with external devices. At least one energy storage device external to the server can be in communication with the plurality of power modules for receiving electrical energy from their output. The at least one energy storage device can also have a plurality of cells for receiving and storing energy output from the power modules. A charging module and a discharge microcontroller supported by the charging module is configured by an algorithm based pulse width modulator ("PWM") for continually monitoring the at least one energy storage device. The power microcontrollers are configured for generating, from said plurality of power modules, controlled pulses of charge and discharge for increasing storage capacity of the energy storage device. A control microcontroller is carried by and incorporated within the control module and is connected with the at least one energy storage device, the control microcontroller is configured for determining and monitoring voltage levels within the at least one energy storage device and for rebalancing voltage within said at least one energy storage device. Sensor devices are positioned in contact with said at least one energy storage device continually sensing voltage levels within the at least one energy storage device, said sensors being in communication with the control microcontroller for supplying sensed data thereto. A communication and automation module ("CAM") is supported by the control module and in communication with the control microcontroller. The CAM has a programmable dry output for monitoring and interfacing with the control microcontroller and responding to events within the server that are monitored and detected by sensors.

The method of the invention includes receiving a first type of electrical power (such as DC power) from multiple disparate sources through a first busbar (such as a. DC busbar), directing said first type of electrical power to a plurality of power modules for inverting said first type of electrical power to a second type of electrical power (such as AC power) at an output of said power modules, delivering said second type of electrical power from said power modules to a second busbar (such as an AC busbar) connected with the plurality of power modules, and making the second type of electrical power from said power modules available to a location for use, such as an electric load, a storage device, or a national or regional grid system, or an energy storage device. The method also includes controlling various operations of the power modules through a power microcontroller incorporated within each of said power modules, said power microcontroller configured for effecting said control, and controlling and operating said power modules through a control module connected with the power modules. The control module has a control microcontroller carried by and within said control module. Generating controlled pulses of charge and discharge is performed from said power module thereby increasing storage capacity of said energy storage device. The method further includes sensing voltage levels within the energy storage device and supplying sensed voltage levels to the control microcontroller which is configured for rebalancing voltage within said energy storage device, and monitoring said sensed voltage levels by said control microcontroller, as well as detecting lagging or leading power factor based on sensed data and for charging capacitance or inductance as required to correct said lead or lag, the control microcontroller is connected with said energy storage device and configured for said monitoring. And the method includes monitoring and responding to events within the server that are monitored by sensors through a communication and automation module ("CAM") supported by said control module and in communication with said control microcontroller.

Other features, embodiments and aspects of the inventions are further described herein below.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DESCRIPTION OF EMBODIMENTS OF THE INVENTION

Figure 1:
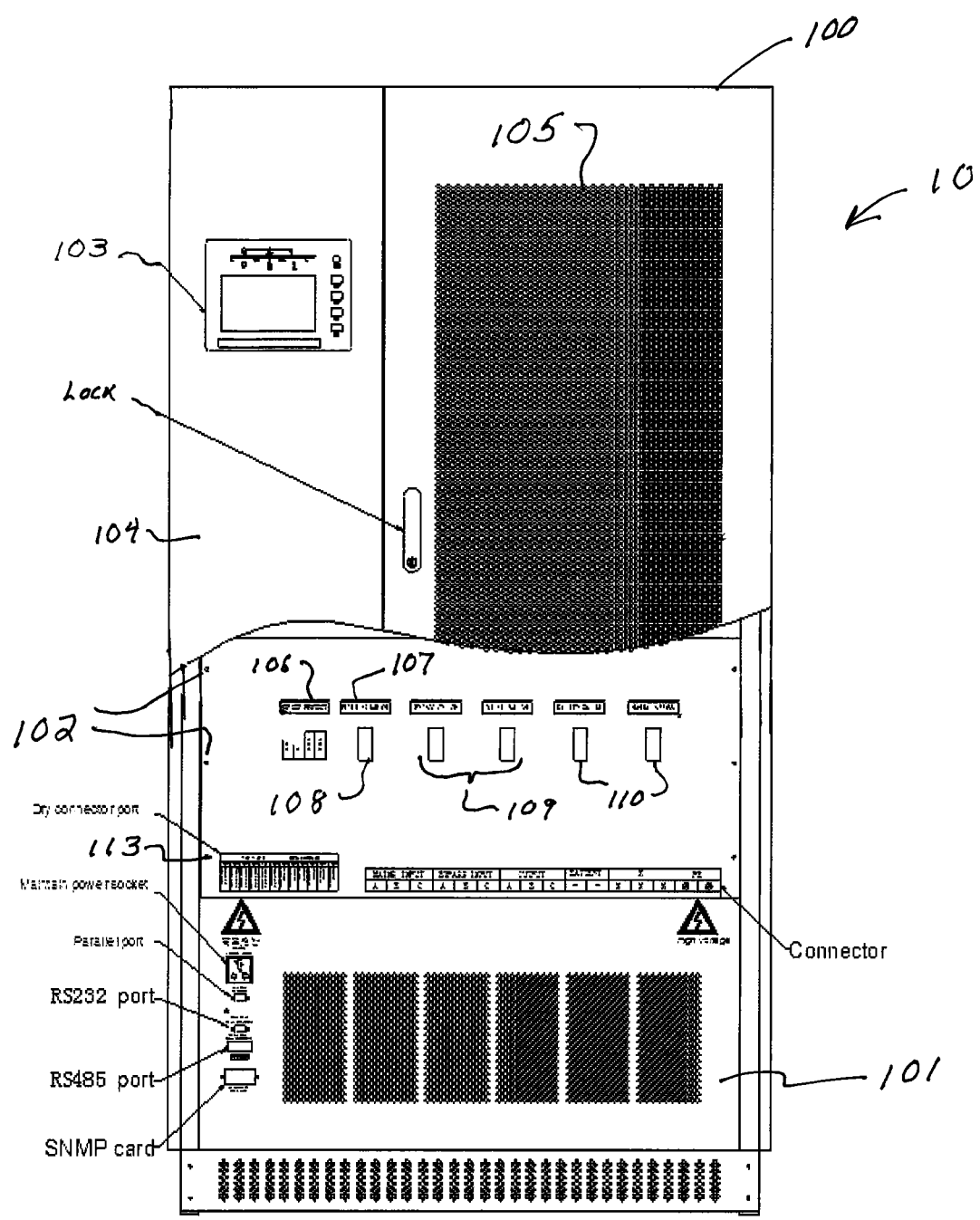
FIG. 1 is a front elevation view of a chassis supporting elements and modules of the invention.

The following disclosure includes embodiments, or examples, for implementing different features of the invention. Specific examples of components and arrangements are described below to simplify the present disclosure. These are, of course, merely examples and are not intended to be limiting. Terms concerning electrical coupling and the like, such as "coupled," "connected" and "interconnected," refer to a relationship wherein structures communicate with one another either directly or indirectly through intervening structures unless expressly described otherwise. For the sake of simplicity, all connections and communication links between and among referenced devices, structures and elements, which are discussed and described herein, may not actually be shown or illustrated in the accompanying drawings, or they may not be shown because such connections or links are not amenable to being shown in the drawings. However, those skilled in the art will understand and appreciate the existence of such connections and links from the descriptions herein and from the context in which they are described. In addition, the present disclosure may repeat reference numerals and/or letters in the various examples. This repetition is for the purpose of simplicity and clarity and does not in itself dictate a relationship between the various embodiments and/or configurations discussed.

The description below together with the annexed drawings, illustrate and describe an illustrative example of the energy server 10 of the present invention for aggregating, managing, converting, inverting and controlling energy from different types of inputs and storage media. The server is completely flexible and scalable due to its modular design and incorporates unique features described below.

Referring first to FIG. 1, a chassis 100 serves as the infrastructure platform for the energy server 10 of the invention and includes a casing (or "rack") 101 with slots 102 for receiving and supporting various modules and elements of the invention. In one embodiment of the invention, which is exemplary, the following system modules are supported in the slots of the rack 101: a monitor module 103; charger module 104; and power modules 105 (multiple power modules 105 may be provided). Surge protective devices 106 and 107 may also be provided in the power lines to each of the modules for protection. Input, output and bypass circuit breakers 108, 109 and 110 respectively may also be provided in the input, output and bypass lines (as discussed below) for further system protection. The power modules 105 (sometime referred to herein also as the "inverter modules" or "inverter") have a sine wave curve that is configured to operate at a very high resolution of 1024 bits per quarter cycle as opposed to existing inverters that operate at 16 bits per quarter cycle. This high speed switching of field-effect transistor ("FET") devices is achieved through the use of wide bandgap gallium nitride devices (also known as GaN FET) and configuring the microcontroller in the power module to enable the use of GaN devices to generate a sine wave with very high resolution of 1024 bits per quarter cycle.

Silicon (Si) technology has displaced almost all prior low power thermionic and electromechanical devices, but fundamental material limitations have stalled its use in higher power applications. GaN devices are now available for high power applications. Advantages of GaN devices include: reduced heat sink requirements; 80% reduction in system volume and weight; lower voltage drop for unipolar devices; increased output power; improved transient characteristics and switching speed; reduced electrical noise from smaller system packages; and reduced electrical noise due to virtually zero recovery charge.

The power module handles very high torque loads of up to 1000% generated by reactive loads as opposed to current inverters which handle a maximum of 250%. High torque loads generated by all reactive loads are handled by combining the properties of the high resolution sine wave (as described above) and operating at high input DC voltages (384 VDC-1200 VDC). The power module DC to AC efficiency is extremely high, over 96% for reactive loads and over 99% for resistive loads. Such high efficiencies are achieved by combining the high speed/low loss switching (as above) and high operating DC voltage (384 VDC-1200 VDC).

Figure 9:
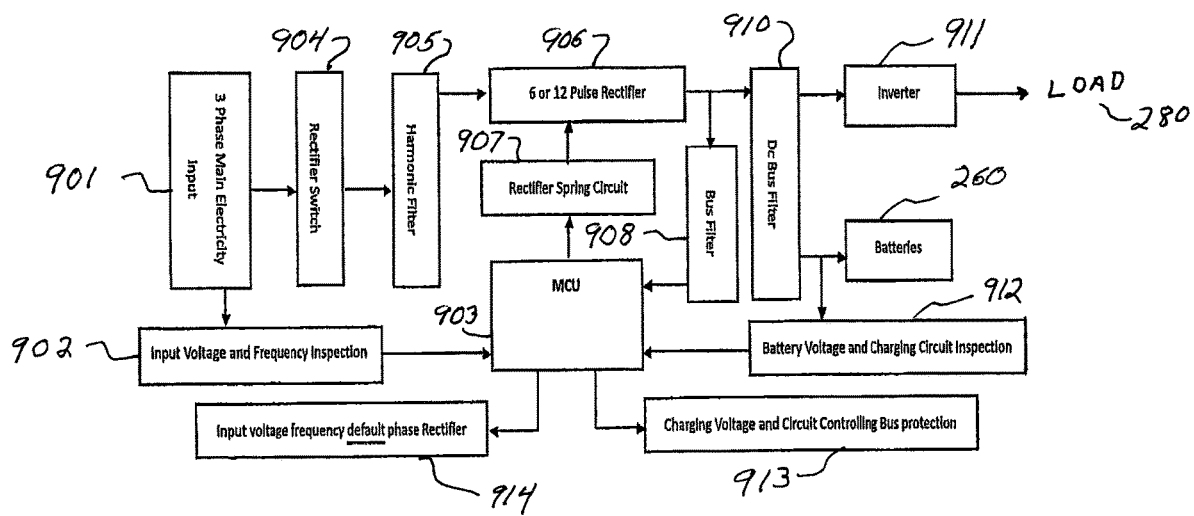
FIG. 9 is a schematic illustration of the arrangement and connections for the power module of the present invention.

The power module 105, functions primarily as an inverter of DC power to AC power. FIG. 9 schematically illustrates the arrangement and connections of the power module 105. Accordingly, the power module 105 includes a microcontroller unit ("MCU") 903, which is configured for controlling the operations of the power module. Input operating voltage is supplied to the MCU 903 through a voltage and inspection element 902, which is supplied with operating voltage from a 3 phase main electricity input 901. Input 901 also feeds voltage to a rectifier switch 904 which supplies rectified voltage to a harmonic filter 905. The harmonic filter 905 is configured for limiting voltage fluctuations and improving the operations of the power module. Such filters are commercially known and available. Filter 905 then feeds a 6 or 12 pulse rectifier 906 for rectifying the voltage signal. MCU 903 is configured to control the operation of the rectifier via rectifier spring circuit 907. The rectified voltage signal is then fed from the rectifier 906 to both a bus filter 908 for feeding into the MCU 903, and to a DC bus filter 910 which supplies power both to batteries 260, which are external to the server, and to off grid inverter 911, which is connected to the load directly. Power from the DC bus filter 910 also supplies power to a battery voltage and circuit controlling bus protection unit 912. The battery voltage and circuit controlling bus protection unit 912 then feeds back to the MCU 903, which in turn operates a charging voltage circuit controlling protection 913 and an input voltage default phase rectifier 914. Batteries 260 can be a variety of types, including for example multi-cell chemical batteries.

During normal operation, AC power from a grid network is supplied at the AC input 901 and goes through rectifier switch 904, filter 905, rectifier 906, then busbar 910, to inverter 911 and to a load 280, or to external battery 260. During this time, PV energy controlled by internal MPPT, supplies power to charge the battery 260. When the grid is not available, such as due to an outage on the grid, the system seamlessly shifts the supply to battery and PV from an external PV panel which produces energy from sunlight 920 through a solar controller then to the load 280 to power the load, or the system seamlessly shifts the supply to the battery 260 and then to the load, therefore ensuring continuous power supply. During daylight hours, with sufficient PV input and with grid power available, power will be provided from the solar panels and will be adjusted by the solar controller into the maximum power supply condition to supply the load, while grid input is on standby, and to concurrently charge the battery 260 with any excess power.

During night time hours, also with grid power available, power will be supplied from the external battery 260 (which has been charged from PV solar panels during the daylight hours), which discharges to a pre-set value (with a reserve for emergency use). If the battery 260 is fully discharged before the PV panels start producing the next day, the system will switch automatically to the grid, supplying power to the load until PV input starts again. On cloudy/rainy days, with insufficient sunshine to charge the battery, but with grid power available, power will first be supplied by the PV solar panels and any excess will concurrently charge the battery 260. When the PV power is no longer available, the battery will supply power to the load 280 until it is discharged to a pre-set value (keeping a reserve for emergency use), subsequent to which the system will switch automatically to the grid to supply power to the load. At night, with the grid not available, battery power will be used.

During periods of maintenance, power from the grid can be supplied through a by-pass switch to power the load 280. Switches SW1, SW2 and SW3 are employed accordingly.

Figure 2:
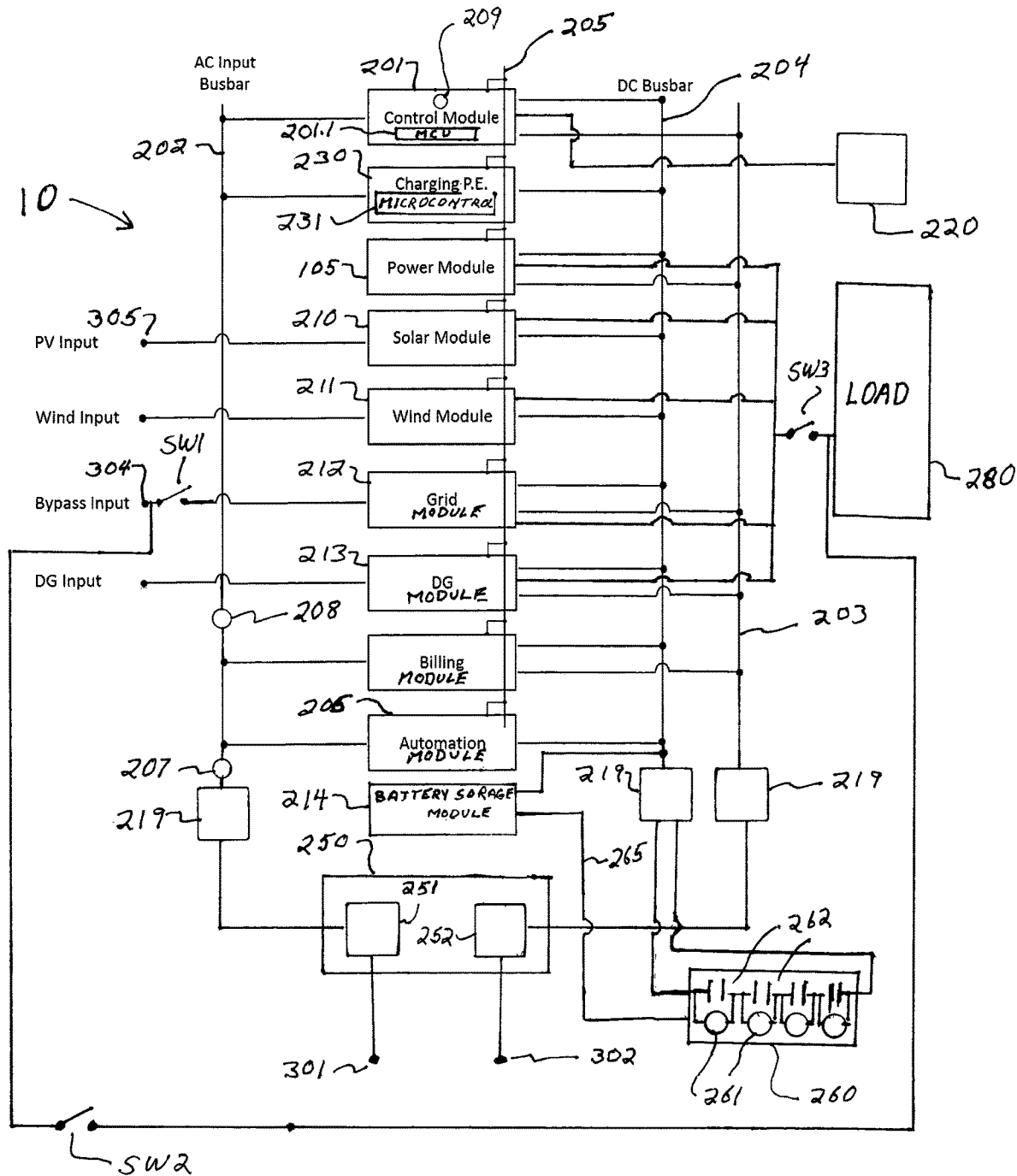
FIG. 2 is a schematic diagram illustrating the overall system architecture embodying the principals of the invention.

Although not readily visible in FIG. 1, but as seen in FIG. 2, the chassis 100 also includes AC input busbar 202, AC output busbar 203, DC busbar 204 and communication busbar 205, as well as a control module 201 which, are supported by the casing (rack) 101. The control module 201 includes a communication and automation module (CAM) 205, which may be mounted as a separate element in the rack 101, as further described herein below. As noted above, the various functional modules, in practice, are inserted in the slots 102 for support in the chassis 100, connected to the busbars via safety screws (not shown), and are controlled and operated by the control module 201.

Control module 201 communicates with an interface 220 (such as a graphical user interface), for effecting communication with external devices or systems having different protocols. The interface 220 employs well known industry standards for communication protocols in machine communications, such as USB, RS232, RS485, and dry contact.

Each busbar is connected to either an input or an output through thermal circuit breakers 108, 109 and 110. Current, voltage and temperature sensors 207, 208 and 209, respectively are connected on these busbars to provide data to the control module 201. Other devices (not shown) such as cooling fans and air-conditioners, as is typical, may also be installed in the chassis 100 for cooling purposes, depending on the type and size of the energy server.

One or more power modules 105 (which may include a solar power module 210, a wind power module 211, a grid power module 212, and a diesel generator ("DG") power module 213) are also supported in the chassis 100 carried by casing 101. The power modules operate (as illustrated and described in connection with FIG. 9) to invert input voltage and then make that supply power available to at least one external battery (such as battery 260) and to the load 280. Load 280 can be any type of AC load, reactive or resistive, and is driven from all the disparate input (AC/DC) energy sources. In addition to standard maximum power point tracking ("MPPT") function, the solar and wind modules increase the storage capacity of standard Lead Acid/AGM/Gel/LiFePo4 batteries by 40% and enable operation of a super-capacitor, lead acid or lithium ion battery at 100% depth-of-discharge without affecting cycle life. (Current solar charge controllers and wind charge controllers do not have such functionality). The microcontroller carried by each of the solar or wind power modules is configured by an algorithm to drive a set of controlled pulsating bursts of charge and discharge in short durations. This activity, which is monitored and controlled by the microcontroller within the solar or wind module, results in increasing the ionic density of the electrolyte inside the chemical battery (but only for lead acid, AGM and gel batteries), hence increasing its storage capacity. An additional benefit of increasing storage capacity is the ability to safely operate the battery at depth-of-discharge of 100% without effecting cycle life.

Although, for convenience, only a single battery 260 is illustrated in FIG. 2, it should be readily understood that when referring to "battery 260" or to "a battery" or "the battery" herein, it is intended to include multiple batteries ganged together, or an array of batteries that are connected in series and parallel to the server 10. Such batteries may also have multiple cells 262. Individual batteries in the connected array can develop an imbalanced charging state due to manufacturing tolerances which can result in the imbalanced batteries becoming damaged over time. In order to protect the batteries from damage, the server continually monitors the condition of each individual cell in the array through cell sensors 261 and balances each cell by drawing charge from cells in an overcharged state and supplying the charge to cells in an undercharged state. Sensors 261 monitor voltage, temperature and internal resistance of every cell and convey that data to a microcontroller within battery storage module 214 via RS484 communication line 265 for thus controlling the balancing of the cells.

Each battery 260 is controlled by discharge microcontroller 231, supported by charging module 230, and configured by an algorithm based pulse width modulator ("PWM") that continually monitors cell voltage and compares it with the other cells in the battery. When an imbalance of overcharge is detected, the discharge controller draws the charge from the overcharged cell and supplies this to an auxiliary battery cell connected to the controller from where it is supplied back to the cell with the lowest charge. In this way active battery balancing is achieved.

The AC input busbar 202 (for various configurations or embodiments, such as: 3 phase 440V 50 Hz; 3 phase 220V 60 Hz; 1 phase 220V 50 Hz; or 1 phase 110 V 60 Hz) is mounted in the chassis 100 through 1500V AC isolators 219 and is connected to the various modules and other system elements through the micro-switch connectors 113 in the module slots (see FIG. 1). The AC input busbar 202 is thus isolated and the various modules are hot swappable (as used herein, the expression "hot swappable" is intended to mean that a module can be removed or installed without operationally shutting down the chassis or system). The AC input busbar 202 is capable of handling an input of 2× its rated capacity (in kW) as a constant load and 10× its rated capacity (in kW) as an instantaneous load for 2 s. Such busbars are well known in the art and are commercially available to consumers in the electrical and electronic arts.

The various disparate inputs of power (whether solar, wind, turbine, diesel generator, grid, geothermal, battery, or any other AC or DC source) connected to the server 10 can be blended in a pre-determined percentage and delivered with regulated power quality output. All such input energy sources (i.e. AC, DC, battery), as well as the server's internal capacitor storage, are regulated on a common DC busbar 204 which is the primary source that drives the inverters. In case of transfer of one energy source to the other, as signaled by a central control microcontroller (the "control microcontroller") 201.1 carried by the control module, the battery and/or capacitor storage provide interim energy to the DC busbar until the transfer between sources is completed. As a result, the inverter stays fully energized during the transition and therefore, switching between sources is seamless and virtually instantaneous.

Figure 12:
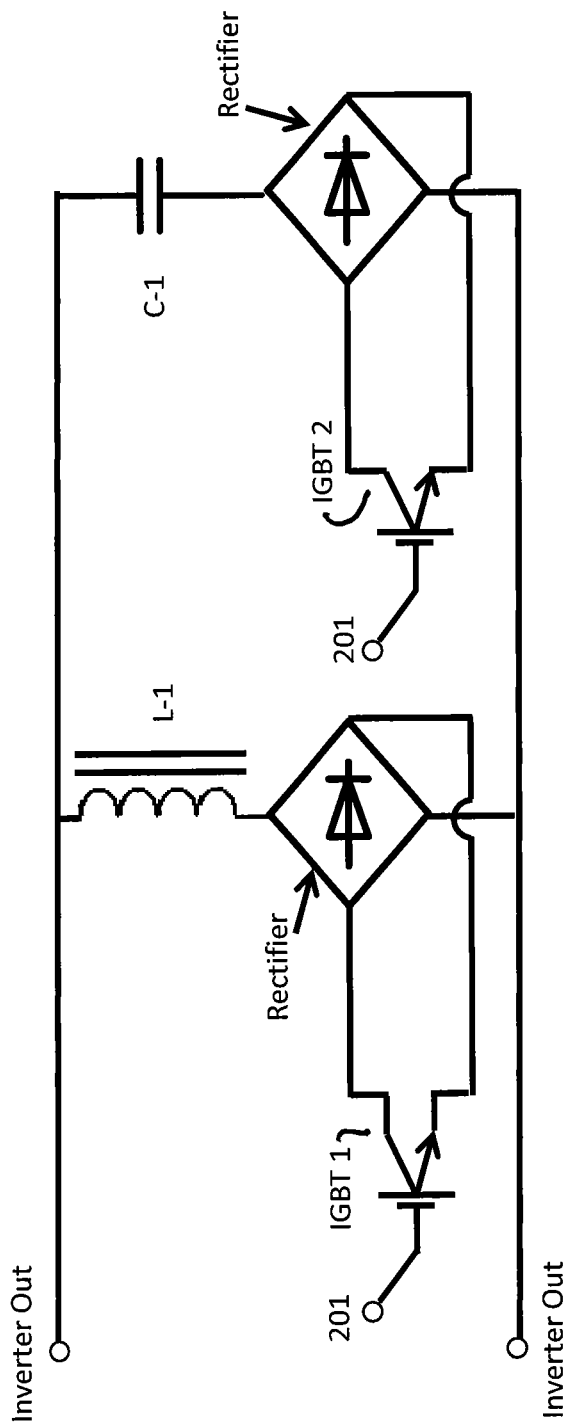
FIG. 12 is a circuit diagram illustrating the elements for effecting correction of lagging or leading power factor.

Control microcontroller 201.1 of the control module 201 is in communication with the power modules' output connections and thus with the load 208. A control logic of the control microcontroller 201.1 detects lagging or leading power factor on the circuit load and is configured to effect power factor correction. With reference to FIG. 12, the control microcontroller 201.1, symbolically illustrated in FIG. 12 by the terminal notation 201.1, is also configured so that it then charges an embedded single large capacitor C-1 or inductor L-1 in the server, with exactly the capacitance or inductance required to correct the lag/lead. The capacitor C-1 or inductor L-1 then supplies the exact capacitance or inductance to correct the lag or lead. The value of the capacitance or inductance is controlled by the switching of IGBT-1 and IGBT-2 as determined and implemented by control microcontroller 201.1

A control logic of the control microcontroller 201.1 continually detects and analyses resonated harmonics frequencies being generated by reactive loads. It then calculates the R, L, C (resistor, inductor, capacitor) values and applies these values on a circuit (such circuit being formed by the closed current path created through load at the output terminals) to filter out the unwanted frequencies.

Figure 3:
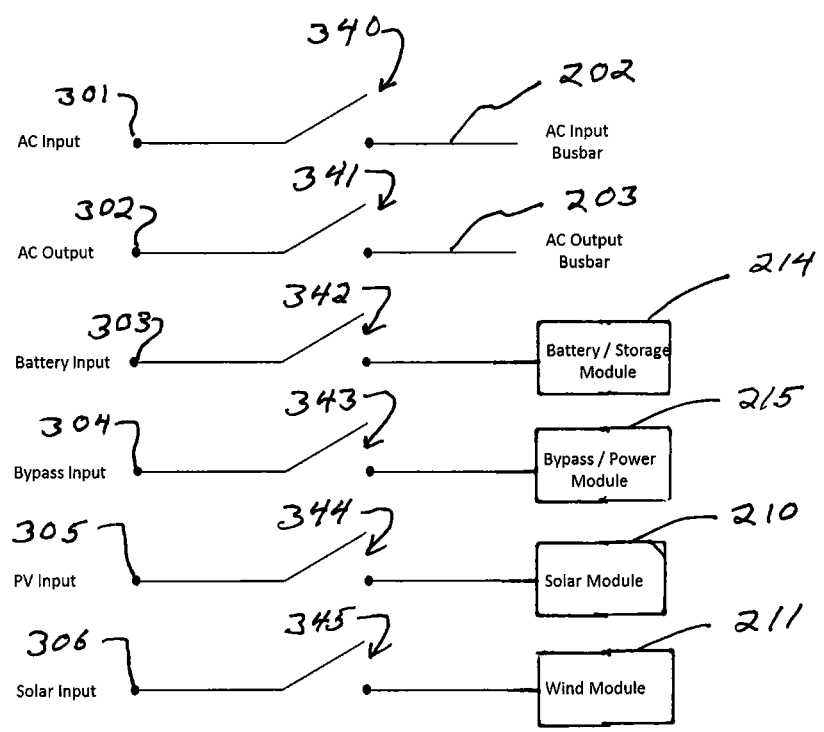
FIG. 3 is a partial schematic diagram showing one aspect of the system of FIG. 2.

Not shown in FIG. 1 or 2, but as illustrated in FIG. 3, a thermal circuit breaker 340, of appropriate rating, is positioned in between the AC input 301 and the AC input busbar 202, for input overload safety. Similarly, circuit breakers 341, 342, 343, 344 and 345 are positioned between the AC output 302 and AC output busbar 203, the battery input 303 and battery/storage module 214 (which can also be supported in chassis 100), bypass input 304 and bypass/power module 215, PV input 305 and solar module 210 and solar input 306 and wind module 211, respectively. Voltage and hall effect current sensors are also installed on the busbar to monitor for the current and voltage by the control module 201.

The AC output busbar 203 (3 phase 440V 50 Hz/3 phase 220V 60 Hz/1 phase 220V 50 Hz/1 phase 110V 60 Hz) is mounted in the chassis 100 through 1500V AC isolators 219 and is connected to the various modules and other system elements through the connectors such as 113 in the module slots 102. The AC output busbar 203 is isolated and the modules are hot swappable. The AC output busbar 203 is capable of handling an output of 2× its rated capacity (in kW) as a constant load and 10× rated capacity (in kW) as an instantaneous load for 2s. Thermal circuit breaker 341 shown in FIG. 3, of appropriate rating is positioned in between the AC output 302 and the AC output busbar 203 for output overload safety. Voltage, hall effect current and other sensors (such as sensors 207, 208 and 209, see FIG. 1) are also installed on the busbar to monitor for current and voltage by the control module.

The DC busbar 204 is also mounted in the chassis 100 through 1500V DC isolators 219 and is connected to the various modules and other system elements or devices through the connectors, such as 113, in the module slots 102. DC busbar 204 is isolated and the modules are hot swappable. The DC busbar 204 is capable of handling 2× its rated DC capacity (in kW) as a constant load and 10× its rated DC capacity (in kW) as an instantaneous load for 2 s. The Voltage hall effect current and other sensors (such as sensors 207, 208 and 209, see FIG. 1) are positioned on the busbar to monitor for the current and voltage by the Control Module.

A 4 wire duplex communication busbar 205 is connected to a connector 113 in every module slot 102 of the chassis 100 and is the channel for communication between the various modules.

The following are the input and output connectors installed in the chassis module 100: AC input 301; AC output 302; battery input 303; storage input (DC); bypass input (AC) 304; PV input (DC) 305; wind input (DC/AC) in the wind module; and generator input (AC) (the bypass input is also used as generator input).

All inputs and outputs are installed through circuit breakers 340-345 for overload protection, as illustrated in FIG. 3.

Each of the slots in the rack 101 of the chassis 100 for receiving and supporting the various system modules and other system elements carries micro-switch connector 113. This micro-switch 113 is depressed when a specified safety screw in the inserted module is tightened. Once the micro-switch 113 is depressed, an electric signal is transmitted to the control module 201 and provides data about the inserted module thereby allowing the control module to initiate the initialization process of the inserted module, synchronizing it with the operating modules in the system. Inserting modules into the slots, and removing them from the slots, is a seamless operation that can be performed while the energy server is in operation, providing continual operability, and therefore prevents power disruption.

Figure 4A:
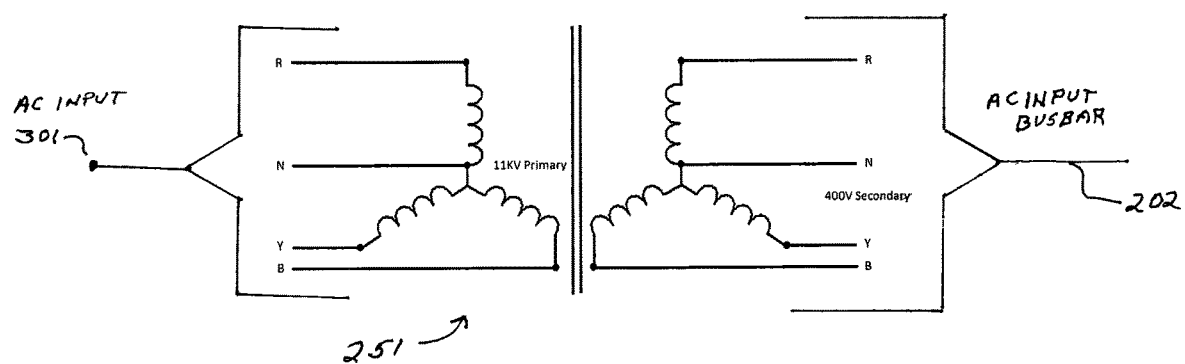
FIGS. 4(a) and 4(b) are schematic illustrations of voltage conversion transformers incorporated in the invention when using a system with medium or high voltage lines.
Figure 4B:
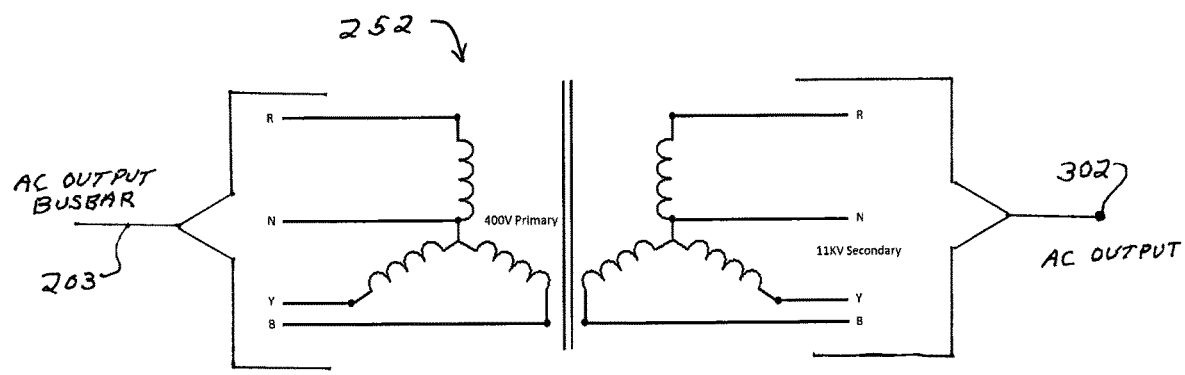

A voltage conversion chassis module 250 contains voltage conversion transformers 251 and 252 at the input and output, respectively of the chassis 250 so that the input and output operating voltages can be converted according to the requirements. This is used when using the chassis module 250 with medium or high voltage lines. Once connected, the input and output voltages of the chassis module 250 can be converted to medium or high voltages. FIGS. 4(a) and 4(b), schematically illustrate voltage conversion transformers 251 and 252 for converting input and output voltages, respectively. In the example illustrated in FIG. 4(a) a primary input voltage of 11 KV is stepped down to a secondary voltage of 400V by the input voltage conversion transformer 251. In the example shown in FIG. 4(b), a primary output voltage of 400V is stepped up to a secondary voltage of 11 KV by the output voltage conversion transformer 252. In an embodiment of the invention, the voltage conversion transformers are an integral part of the server, so no external or separate chassis, such as chassis 250 would be required.

Figure 5:
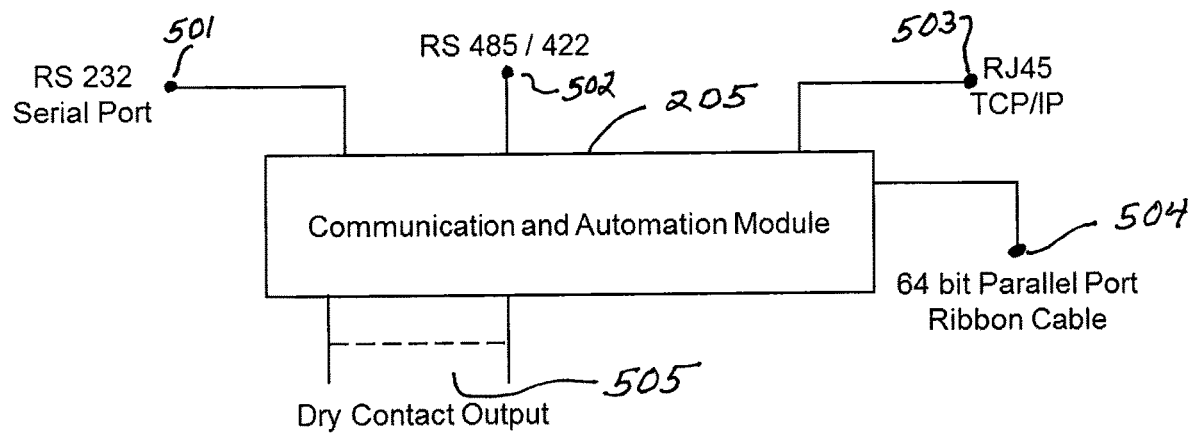
FIG. 5 illustrates a communication and automation module (the "CAM"), as a universal converter for communicating with a control module of the invention.

The communication and automation module (the "CAM") 205, schematically illustrated in FIG. 5, is a universal protocol converter embedded with serial ports 501 (RS232), 502 (RS485/RS422) and 503 (TCP/IP Ethernet port). The CAM communicates with the control module 201 through a 64-bit parallel port 504 and then converts this communication to different protocols. The CAM 205 supports MODBUS, MODBUS over TCP/IP, MODBUS over RS485, CANBUS, PROFIBUS and S BUS.

The CAM also has an 8-port dry contact output 505 that is user programmable. Each port is programmable to respond to a specific event determined by various sensors throughout the server, such as low battery alarm, system overload, battery disconnect, inverter shutdown, static bypass, grid failure, module failure etc. or to respond to any event in the system.

The CAM 205 also incorporates a programmable automation feature to communicate with external devices that may be connected to the System. This automation feature of the CAM 205 communicates with the control module 201 also on the same 64-bit port 505.

While the CAM 205 has a separate slot in the chassis 100, it operates as an integral part of the control module 201 and if unplugged will cause a shut down of the control module 201, hence shutting down the server system.

The grid/charging module 230 operates to: (i) convert AC into DC voltage; (ii) charging battery 260 using a bi-directional DC to DC converter; and (iii) for static switching between bypass and inverter in case of inverter failure and inverter restart.

When the grid/charging module 230 is plugged into its slot in the chassis 100, it operates to connect the busbars through a special hot swappable connecter.

The grid/charging module 230 incorporates a microcontroller 231, which is configured in order to perform the following:
  (i) detect if input DC voltage is present on the DC busbar;
  (ii) detect that the safety screw is in place;
  (iii) confirm if the input DC voltage is within the correct range;
  (iv) confirm if the input AC voltage is within the correct range;
  (v) check if a handshake signal is present on the communication busbar 205;

(vi) connect with the control module 201 through the communication busbar 205;
(vii) receive its module number assignment from the control module 201; and
(viii) communicate with the control module to receive instructions on usage of grid input which is either:
  a. to switch grid input statically at the output and shut down the inverter (static switching mode); or
  b. to switch on the AC to DC rectifier, then convert the grid input to DC and merge this DC power with the DC busbar 204. The DC power is merged in accordance with a policy programmed by a user and communicated to the grid/charging module 230 by the control module 201 (AC to DC rectification mode); or
  c. to switch on the AC to DC rectifier in current limiting mode, then convert the grid input to DC and merge this DC power with the DC busbar to supply the inverter (AC to DC rectification and current limiting mode).

Figure 6:
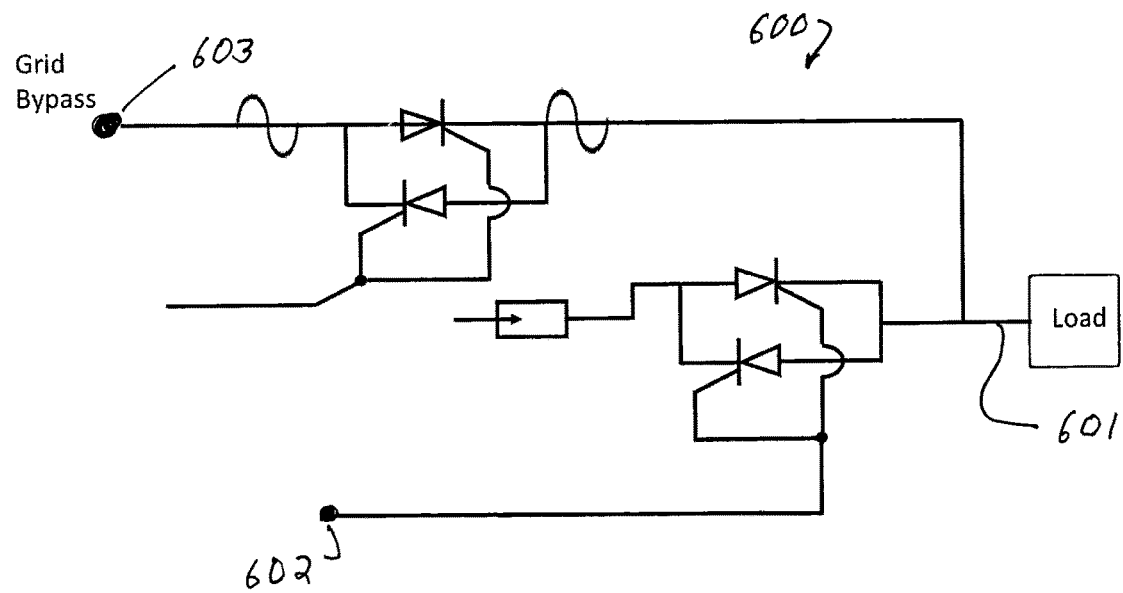
FIG. 6 is a circuit diagram of a static switching circuit used in the present invention.

Once the grid/charging module 230 is started in any of the above modes, it continuously communicates with the control module 201 to receive operating instructions about current limiting value or changing the mode. The operation of each mode is described below The static switching mode is accomplished, as shown in FIG. 6, through the static switch 600 which incorporates combination switching of bi-directional silicon controlled rectifier ("SCR") in forward and reverse connection, which are also connected to the PWM microcontroller 231. There are 2 SCR pairs operating in single-pole double-through mode (common 601 connected to the load, NC 602 (normally closed contact) connected to the inverter, NO 603 (normally open contact) connected to the bypass terminal). Once the PWM microcontroller receives the instructions from the control module, it switches from NC to NO mode. The switching time from NC to NO mode is completed in 5 ms. This bypass switch arrangement is used to connect an emergency power source to the load 280 in case of inverter failure or any other failure of energy source which may result in zero power at the output. The static bypass switches the load 280 to a pre-defined energy source statically by the user. Switching time is 4 ms with Phase Locked Loop ("PLL") synchronization. This is achieved using semi-conductor static devices (SCR—Silicon Controlled Rectifier). No electromechanical relay is used. The manual bypass is an electromechanical switch connected on the terminal post of the server which is manually operated by the user. This manual bypass can be used for maintenance. Once the manual bypass is engaged the power is bypassed from the terminal posts and maintenance can be done anywhere inside the system. In case of an overload or short circuit on the output load the Server's auto bypass function automatically bypasses the load to the grid through the static bypass switch. In case the grid is not available or overload/short circuit is greater than 200% of the sever capacity, the internal safeties shutdown the server. This functionality is achieved through the control module microcontroller 201.1 monitoring the output current/load—this detects the overload or short circuit and signals the static bypass switch to transfer the load from the inverter directly to the grid and in case of no grid availability or overload greater than 200%, to shut down the server.

The switching response time is 5 ms i.e. the time counted from the occurrence of failure until the restoration of backup power. In case of an overload or short circuit on the output load 280 the auto bypass function automatically bypasses the load to the grid through the static bypass switch 600. In case the grid is not available or overload/short circuit is greater than 200% of the sever capacity, the internal safeties (described herein) shutdown the server. This functionality is achieved through the microcontroller 201.1 monitoring the output current/load—this detects the overload or short circuit and signals the static bypass switch 600 to transfer the load from the inverter directly to the grid and in case of no grid availability or overload greater than 200%, to shut down the server.

Figure 7:
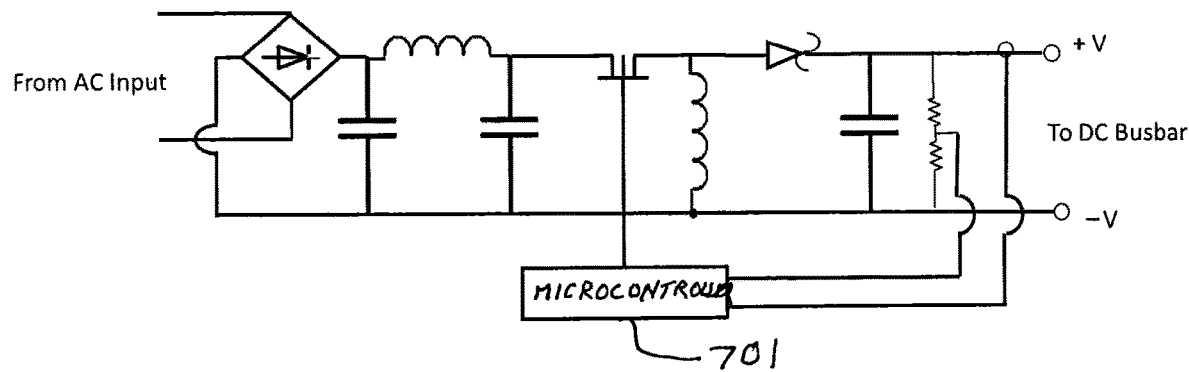
FIG. 7 is a circuit diagram illustrating an AC to DC rectifier used in the present invention.

The AC to DC rectifier mode, illustrated in FIG. 7, consists of a PWM mode switching power supply with a bridge mode rectifier and an inductor—capacitor circuit ("L-C circuit") filter which is connected to an insulated gate bipolar transistor (IGBT-7) shown in FIG. 7 that is controlled by a PWM microcontroller 701 configured to control the IGBT-7. The IGBT-7 switches the DC power of a power inductor and transfers the discharge power from the inductor to the DC busbar 204 after filtering it through a short key rectifier and an output capacitor. This entire process is regulated by the PWM microcontroller 701 with feedback from the voltage and current sensors at the DC output. The L-C circuit can act as an electrical resonator, an electrical analogue of a tuning fork, storing energy oscillating at the circuit's resonant frequency. The IGBT is a three-terminal power semiconductor device primarily used as an electronic switch which, as it was developed, came to combine high efficiency and fast switching.

In AC to DC rectification and current limiting mode, the process of rectification is monitored by a control logic in the microcontroller 231 in the charging module 230 and the current is limited based on optimizing the load and battery state-of-charge ("SOC"). The control logic continually checks the load and battery SOC and limits the current so that the load operates safely and the battery is not overcharged.

The rectification process starts and continues after the PWM microcontroller 231 (which runs the pulse width modulation function) receives information from the control microcontroller 201.1 of control module 201 regarding the AC input voltage and whether or not that the AC input voltage is within the correct range (which is to be programmed by the user). In case the AC input voltage falls outside the set range, the control microcontroller 201.1 shuts down the process. When the AC input voltage returns to the set range, the control microcontroller 201.1 restarts the process.

The rated power of each module is 20 kW or 50 kW or 100 kW. In an overload event, the PWM microcontroller 201.1 shuts down the process immediately. The PWM microcontroller 201.1 analyzes the load situation after 60 s-120 s (time is programmed by the user). If the overload persists it remains shutdown unless reset manually.

Figure 8:
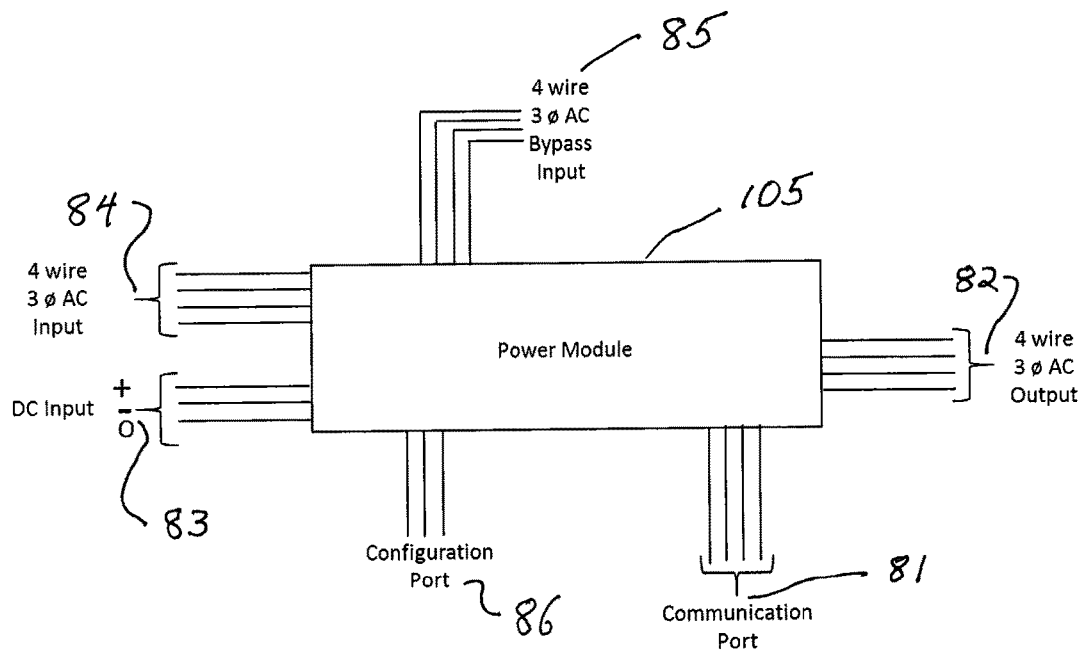
FIG. 8 is a schematic diagram of the inverter (power) module used in the present invention for connecting the AC input busbar, the AC output busbar, the DC busbar and the communication busbar of the chassis shown in FIG. 1.
Figure 11:
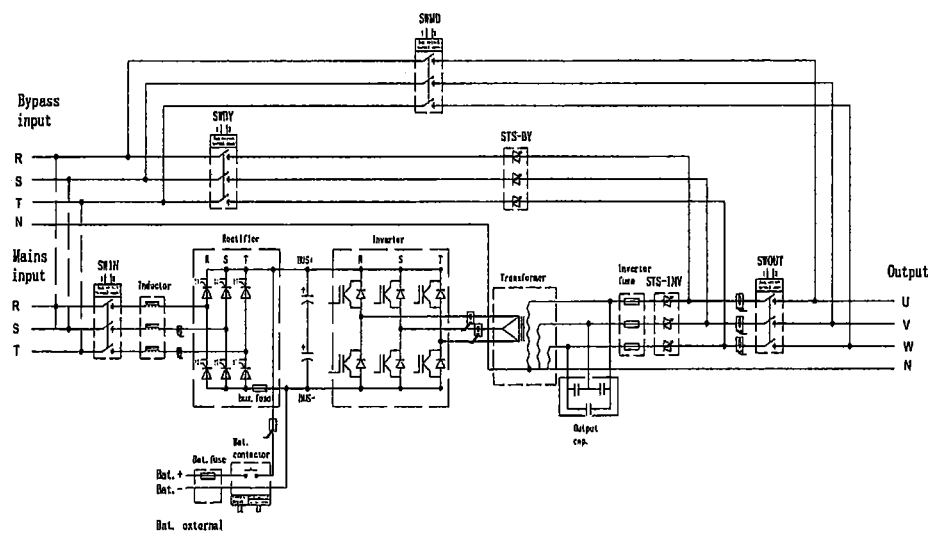
FIG. 11 is a circuit diagram of the inverter module illustrated in FIG. 8.

The power module 105 (or, as noted above "inverter module"), shown in FIG. 8, is a hot swappable module and includes connections with the following busbars: AC input busbar 202; AC output busbar 203; DC busbar 204; and communication busbar 205. A circuit diagram of the inverter module is illustrated in FIG. 11. The power module also has a communication port 81 for contact with the communication busbar 205, an output port 82 for providing output power to the AC output busbar 203 a DC input port for contact with the DC busbar 204, an AC input port 84 for contact with the AC input busbar 202, a bypass input port 85 for contact with bypass input 304 and a configuration port 86.

The inverter module 201 operates to invert DC input from the DC input busbar into AC output on a pre-defined frequency (50 Hz or 60 Hz) and output voltage (90V or 110V or 220V/240V per phase). The inverter module 201 then synchronizes the AC output at the AC output busbar of the chassis 100.

Figure 10:
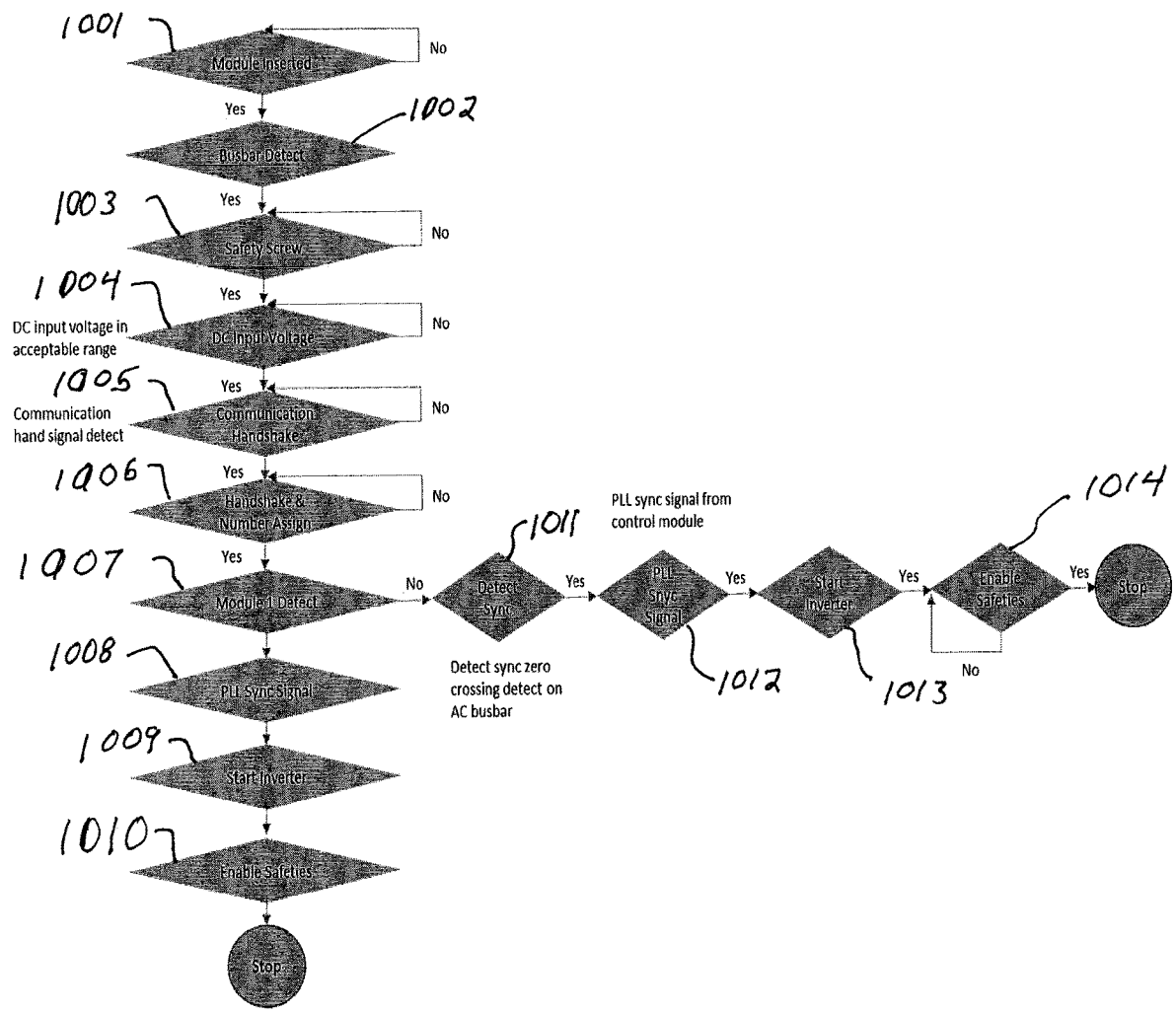
FIG. 10 is a flow diagram illustrating the startup sequence when the inverter module shown in FIG. 8 is plugged into the chassis illustrated in FIG. 1.

When the first inverter (power) module is plugged into its slot in the chassis 100, it connects to the various busbars through special hot swappable connecters. The startup sequence process is shown in FIG. 10.

MCU 903 of the inverter (power) module 201 is configured so that when the first inverter module is plugged into the chassis 100 at step 1001, the MCU 903 within of the inverter module performs the following further steps. Step 1002 detects if input DC voltage is present on the DC busbar. If yes, it then detects at 1003 if the safety screw is in place. If not, the step is repeated. If yes, MCU 903 then confirms at step 1004 if the input DC voltage is within the correct range. Then, it checks at 1005 if the handshake signal is present on the communication busbar 205. Next, at 1006, it connects with the control module 201 through the communication busbar 205 and receives its module number assignment from the control module 201.

After the first inverter module ("Module 1") has received its module number assignment, then Module 1 waits at 1007 for a phase-locked loop ("PLL") signal from the control module 201 to indicate that the phase is related to the phase of the input signal. When it receives the PLL signal from the control module at 1008, then MCU 903 starts this inverter module at step 1009, and at 1010 enables initiation for safety checks programmed into MCU 903 for a DC overvoltage, a DC under voltage, an AC overvoltage, an AC under voltage, and an AC synchronization failure.

For module 2 . . . n, its respective MCU then: detects at 1011 synchronization (zero crossing) detect on AC busbar; receives at 1012 the PLL signal from the control module 201, then starts at 1013 this inverter module; and at 1014 enables safety algorithms for: DC overvoltage; DC under voltage; AC overvoltage; AC under voltage; and AC synchronization failure.

An off-grid inverter 911 is connected to the load directly. Therefore, all the attributes of the load 280 have to be directly handled by the inverter. This problem becomes tedious when the load is reactive. The only way the inverter can handle these problems is with a high-resolution sine wave. It has been established that the minimum resolution that can effectively handle the problems of the load is 1024 bits per quarter cycle.

To achieve this resolution a Digital Signal Processor ("DSP") microcontroller 903 is configured for every quadrant of the sine wave cycle. This signal is then fed to a power drive containing Gallium Nitride power transistors which are connected in bridge mode that are switching between positive and negative DC lines at a frequency of 205 kHz PWM duty cycle. This results in the output of a high-resolution sine wave (1024 bits per quarter cycle). The DC input is as follows:

20 kW rated module: 300 VDC-420 VDC with optimal voltage being 384 VDC.
50 kW rated module: 500 VDC-725 VDC with optimal voltage being 600 VDC
100 kW rated module: 1000 VDC-1450 VDC with optimal voltage being 1200 VDC Because the sine wave generated is high-resolution, it enables the handling of high torque loads for short durations because it does not get distorted with instantaneous currents generated by the load. The schematic of the Inverter Module is shown in FIG. 9 below.

Overvoltage and under voltage protection is provided by the control module microcontroller being configured to continually monitor the voltage of the DC input. If the DC input voltage exceeds the maximum or minimum present limit, the control module microcontroller shuts down the inverter (power) module in order to protect it. In case the electronic shutdown doesn't work, a fast blow safety fuse and a circuit breaker (not shown, well known in the art) do their job.

Overload protection is also provided by the control module microcontroller by it being configured to continually monitor the output load from the sensors on the output lines. The configured protection allows the following overload condition:

Maximum of 1000% for 2 s
Decreasing to 200% over the next 8 s

If the overload condition continues beyond this profile, the control module microcontroller instantly shuts down the inverter (power) module to protect it.

However, if the overload remains within 200%, the configuration of the microcontroller allows operation for another 30 minutes with an alarm. During these 30 minutes, the control module microcontroller 201.1 monitors the condition of the battery storage by communicating with the control module. If the control module microcontroller senses that the battery storage is unable to support the overload, even if it is within the 30-minute duration, the control module microcontroller shuts down the inverter module.

When the module is inserted into the Chassis, and if this isn't the first module, the control microcontroller checks the voltage of AC output busbar before switching on and synchronizing the Inverter. If the voltage is not within the set limits, the Inverter is not switched on, nor synchronized and an alarm is raised. This condition is also communicated to the Control Module.

As the inverter module is synchronizing with the AC output busbar, it constantly monitors through the current sensors the positive and negative current situation. In case a negative energy is detected dumping into the inverter that is flowing in reverse direction meaning synch failure. In this situation the control microcontroller communicates with the control module to get the appropriate PLL synch signal within 1 ms. If this is not rectified the control module microcontroller shuts down the inverter module to protect it.

In order to protect all inputs and outputs, a fast blow fuse is connected on all inputs and outputs of the inverter module. In case of failure of the electronic shutdown safeties described above, the fast blow input and output fuses protect the module.

As described, three different microcontrollers simultaneously control all the components and functions of the server through a common communication bus. In case one microcontroller hangs due to any reason, the watchdog seamlessly transfers the control to the redundant microcontroller within the same machine cycle so there is no loss of instruction and the control remains uninterrupted. The third microcontroller always remains as a backup and maintains the storage of different settings and sensors data.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated

What is claimed is:

1. An apparatus for aggregating and supplying energy comprising:
    at least one power module for inverting a first source electrical power, which is supplied to said at least one power module from a first source of power, to a second type of electrical power at an output of said power module,
    additional power modules for inverting electrical power from first disparate sources of power to said second type of electrical power at an output of each said additional power sources,
    a first busbar connected with said first disparate sources of power and connected with said at least one power module and said additional power modules for providing a first type of electrical power thereto;
    a second busbar connected with an output of said at least one and additional power modules for receiving said second type of electrical power from said at least one power module and said additional power modules and for making said second type of electrical power available to a destination;
    a power microcontroller carried by and incorporated within each of said power modules, each said power microcontroller configured for controlling power inversion operations of said power modules;
    a control module connected with said at least one power module and said additional power modules;
    at least one energy storage device in communication with each of said power modules for receiving electrical energy from the output thereof;
    a charging module and a discharge microcontroller supported by said charging module configured by an algorithm based pulse width modulator ("PWM") for continually monitoring said at least one energy storage device, said discharge microcontroller further configured for generating controlled pulses of charge and discharge for increasing storage capacity of said at least one energy storage device;
    a control microcontroller carried by and incorporated within said control module and connected with said at least one energy storage device;
    voltage sensors positioned in contact with said at least one energy storage device continually sensing voltage levels within said at least one energy storage device, said voltage sensors being in communication with said control microcontroller for supplying sensed voltage data thereto;
    said control microcontroller configured for determining and monitoring the voltage levels within said at least one energy storage device based on said sensed voltage data and for rebalancing said voltage levels within said at least one energy storage device, and further configured for detecting lagging or leading power factor based on sensed data and for charging a capacitance or an inductance as required for correcting the lagging or leading power factor.

2. The apparatus according to claim 1 further comprising, a communication and automation module ("CAM") supported by said control module and in communication with said control microcontroller, said CAM having a programmable dry output for monitoring and interfacing with said control microcontroller and responding to events within the apparatus that are monitored and detected by sensors.

3. The apparatus according to claim 2 further comprising, a supporting chassis and rack supporting therein said at least one power module and said additional power modules, said first and second busbars, said control module, said charging module, said at least one energy storage device, said discharge microcontrollers, said sensors, and said communication and automation module.

4. The apparatus according to claim 3, wherein, said plurality of power modules, said control module, said charging module, and said communication and automation module are hot swappable within said supporting chassis and rack.

5. The apparatus according to claim 3 further comprising, voltage conversion transformers carried by said supporting chassis and rack for converting input and output operating voltages.

6. The apparatus according to claim 1 wherein, said power modules are configured to operate with a sine wave curve for operation at high resolution of 1024 bits per quarter cycle.

7. The apparatus according to claim 6 wherein, GaN FET are used in said power module to enable said high resolution of 1024 bits per quarter cycle.

8. The apparatus according to claim 1 wherein, said destination is a load or a utility grid.

9. The apparatus according to claim 8 further comprising a static switch having a bi-directional silicon controlled rectifier ("SCR") in forward and reverse connection, which are connected to said discharge microcontroller for connecting an emergency power source to said load in case of a failure of energy source.

10. The apparatus according to claim 1 wherein, said at least one electrical energy storage device is a battery.

11. The apparatus according to claim 10 wherein, said battery is a multi-cell battery for receiving and storing energy output from said power modules.

12. The apparatus according to claim 10 wherein, said electrical energy storage device is a multi-cell chemical battery.

13. The apparatus according to claim 10 wherein, said electrical energy storage device is a lithium ion battery.

14. The apparatus according to claim 1 further comprising, an interface connected with said control module for effecting communication of said control module with external devices.

15. The apparatus according to claim 1 further comprising, a communication busbar in contact with said plurality of power modules and said control module for effecting communication there among.

16. The apparatus according to claim 1 wherein, said discharge microcontroller is further configured for continually monitoring cell voltage of said at least one storage device through cell sensors and comparing cell voltage of each said cell with cell voltage of other cells of said energy storage device and configured to draw charge from one cell and providing said charge to an undercharged cell.

17. The apparatus according to claim 1 wherein, said control microcontroller is further configured for continually detecting and analyzing resonated harmonics frequencies being generated by reactive loads and for calculating resistor, inductor and capacitor values and applying said values on a circuit formed by a closed current path created through said load at output terminals to thereby filter out unwanted frequencies.

18. The apparatus according to claim 1 wherein, said at least one power module comprises a power microcontroller configured for controlling its operations, an input for providing operating voltage to said power microcontroller, a rectifier receiving operating voltage from said input and supplying said operating voltage through a harmonic filter to a rectifier, said rectifier in turn supplying rectified voltage to an inverter and then to said load.

19. The apparatus according to claim 18 wherein, said rectified voltage is supplied to a bus filter to be supplied to said power microcontroller, and said rectified voltage is supplied to a DC bus filter which supplies said voltage to said batteries and to said inverter.

20. The apparatus according to claim 1, wherein said first and second type of electrical power is DC power and AC power respectively, and wherein said first and second busbars are DC and AC busbars, respectively.

21. The apparatus according to claim 1, further comprising means for selectively supplying power received from said multiple disparate sources of power to said destination.

22. A method for aggregating and supplying energy comprising:
receiving a first type of electrical power from multiple disparate sources through a first busbar;
directing said first type of electrical power to a plurality of power modules for inverting said first type of electrical power to a second type of electrical power at an output of said power modules;
delivering said second type of electrical power from said power modules to a second busbar connected with said plurality of power modules;
making said second type of electrical power from said power modules available to an energy storage device for energy storage of said power for future use of said second type of electrical power;
making said second type of electrical power from said plurality of modules available to a load for driving said load;
controlling operations of said power modules through a power microcontroller incorporated within each of said power modules, said power microcontroller configured for effecting said control;
controlling and operating said power modules through a control module connected with said power modules, said control module having a control microcontroller carried by and within said control module;
generating controlled pulses of charge and discharge from said power modules thereby increasing storage capacity of said energy storage device;
sensing voltage levels within said energy storage device and supplying sensed voltage level data to said control microcontroller for rebalancing said voltage levels within said energy storage device;
detecting lagging or leading power factor based on sensed data and charging a capacitance or an inductance as required for correcting lagging or leading power factor;
monitoring said sensed voltage levels by said control microcontroller, said control microcontroller connected with said energy storage device and configured for said monitoring; and
monitoring and responding to events that are monitored by sensors through a communication and automation module ("CAM").

23. The method according to claim 22 wherein, said power modules are configured to operate with a sine wave curve for operation at high resolution of 1024 bits per quarter cycle.

24. The method according to claim 22 further comprising, continually monitoring cell voltage of a plurality of cells of said energy storage device through cell sensors and comparing said cell voltage of each cell with cell voltage of other cells of said energy storage device and drawing charge from one cell and providing said charge to an undercharged cell thereby achieving active storage device cell balance.

25. The method according to claim 22 further comprising, continually detecting and analyzing resonated harmonics frequencies being generated by reactive loads and for calculating resistor, inductor and capacitor values and applying said values on a circuit formed by a closed current path created through said load at the output terminals to thereby filter out unwanted frequencies.

26. The method according to claim 22 further comprising connecting an emergency power source to said load in case of a failure of energy source by a static switch having a bi-directional silicon controlled rectifier ("SCR") in forward and reverse connection.

27. The method according to claim 22, wherein said first and second type of electrical power is DC power and AC power respectively, and wherein said first and second busbars are DC and AC busbars, respectively.

28. The method according to claim 22, further comprising selectively supplying power received from said first disparate sources of electrical energy to said load and/or said energy storage device.

* * * * *